(12) United States Patent
Murata

(10) Patent No.: US 10,075,049 B2
(45) Date of Patent: Sep. 11, 2018

(54) STACKING APPARATUS AND STACK MANUFACTURING SYSTEM

(71) Applicant: HODEN SEIMITSU KAKO KENKYUSHO CO., LTD., Atsugi-shi, Kanagawa (JP)

(72) Inventor: Chikara Murata, Zama (JP)

(73) Assignee: HODEN SEIMITSU KAKO KENKYUSHO CO., LTD., Atsugi-shi, Kanagawa (JP)

( * ) Notice: Subject to any disclaimer, the term of this patent is extended or adjusted under 35 U.S.C. 154(b) by 659 days.

(21) Appl. No.: 14/429,811

(22) PCT Filed: May 30, 2013

(86) PCT No.: PCT/JP2013/065021
§ 371 (c)(1),
(2) Date: Mar. 20, 2015

(87) PCT Pub. No.: WO2014/050208
PCT Pub. Date: Apr. 3, 2014

(65) Prior Publication Data
US 2015/0231845 A1     Aug. 20, 2015

(30) Foreign Application Priority Data
Sep. 28, 2012   (JP) .................. 2012-216794

(51) Int. Cl.
*H02K 15/02* (2006.01)
*H01F 41/02* (2006.01)
(Continued)

(52) U.S. Cl.
CPC ............. *H02K 15/02* (2013.01); *B21D 28/32* (2013.01); *B21D 43/22* (2013.01);
(Continued)

(58) Field of Classification Search
CPC ............... B21D 43/22; Y10T 156/1056; Y10T 156/107; Y10T 29/5192; Y10T 29/5138;
(Continued)

(56) References Cited

U.S. PATENT DOCUMENTS 5,271,140 A    12/1993   Futamura et al.
5,755,023 A    5/1998   Neuenschwander
(Continued)

FOREIGN PATENT DOCUMENTS

CN    102112249 A    6/2011
EP    2 893 990 A1    7/2015
(Continued)

OTHER PUBLICATIONS

Machine Translation JP 2003-304654-A, which JP '654 was published Oct. 2003.*
(Continued)

*Primary Examiner* — Erica E Cadugan
(74) *Attorney, Agent, or Firm* — Sughrue Mion, PLLC

(57) ABSTRACT

To provide a stacking apparatus and a stack manufacturing system having high accuracy and productivity. A stacking apparatus 10 includes: a stage unit 40 on which a first material to be stacked 91 and a second material to be stacked 92 are stacked and placed; a sandwiching member 31 that is vertically movable with respect to the stage unit 40, and between which the stage unit 40 the first material to be stacked 91 an the second stacked 92 are sandwiched; and a press member 33 that is vertically movable with respect to the sandwiching member 31 and simultaneously presses the first material to be stacked 91 and the second material to be stacked 92.

4 Claims, 13 Drawing Sheets

(51) Int. Cl.
  *B21D 43/22*  (2006.01)
  *B21D 28/32*  (2006.01)
  *B21D 28/04*  (2006.01)
  *B21D 28/10*  (2006.01)

(52) U.S. Cl.
  CPC ......... *H01F 41/0213* (2013.01); *B21D 28/10* (2013.01); *Y10T 29/5138* (2015.01); *Y10T 29/5143* (2015.01); *Y10T 29/5192* (2015.01); *Y10T 156/107* (2015.01); *Y10T 156/1056* (2015.01)

(58) Field of Classification Search
  CPC .. Y10T 29/5143; H02K 15/02; H02K 15/022; H02K 15/024; H02K 15/026; H02K 15/028; H01F 41/02; H01F 41/0206; H01F 41/0213; H01F 41/022; H01F 41/0226; H01F 41/0233; H01F 41/024; H01F 41/0246; H01F 41/0253; H01F 41/026; H01F 41/0266; H01F 41/0273; H01F 41/028; H01F 41/0286; H01F 41/0293
  USPC ............ 156/252, 261; 29/33 L, 564.2, 564.7
  See application file for complete search history.

(56) References Cited

U.S. PATENT DOCUMENTS 6,829,815 B1 * 12/2004 Henschel ................. H02K 1/16
                                                      29/592.1
2015/0224559 A1    8/2015 Murata

FOREIGN PATENT DOCUMENTS

| JP | 04-017998 A    | 1/1992  |
| JP | 2000-263148 A  | 9/2000  |
| JP | 2001-016832 A  | 1/2001  |
| JP | 2002-045937 A  | 2/2002  |
| JP | 2003-304654 A  | 10/2003 |
| JP | 2008-078345 A  | 4/2008  |
| JP | 2012-139726 A  | 7/2012  |

OTHER PUBLICATIONS

Notice of Rejection dated Dec. 7, 2016, from the Taiwanese Patent Office in counterpart application No. 102125556.

Extended European Search Report dated Apr. 22, 2016 from the European Patent Office in counterpart European application No. 13842496.5.

International Search Report for PCT/JP2013/065021 dated Aug. 27, 2013 [PCT/ISA/210].

* cited by examiner

FIG.10
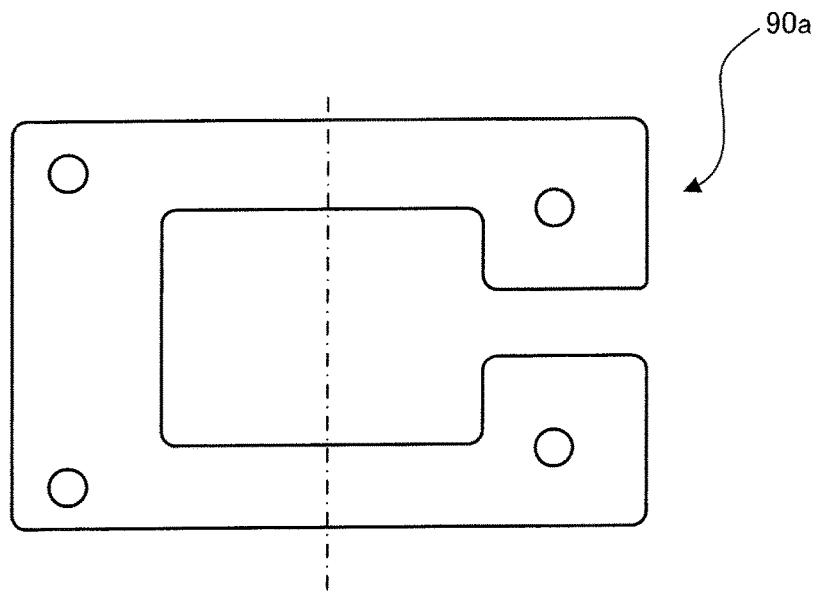
(a)
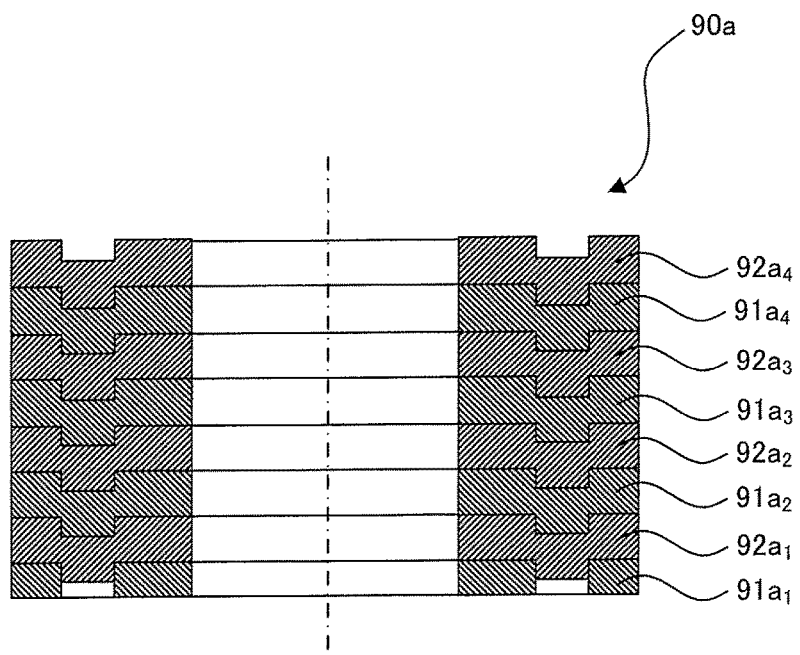
(b)

STACKING APPARATUS AND STACK MANUFACTURING SYSTEM

CROSS REFERENCE TO RELATED APPLICATIONS

This application is a National Stage of International Application No. PCT/JP2013/065021 filed May 30, 2013, claiming priority based on Japanese Patent Application No. 2012-216794 filed Sep. 28, 2012, the contents of all of which are incorporated herein by reference in their entirety.

TECHNICAL FIELD

The present invention relates to a stacking apparatus and a stack manufacturing system which stack and integrate a plurality of component members.

BACKGROUND ART

A stack manufacturing apparatus which progressively feeds a hooped long material to be machined in its longitudinal direction, forms relief holes within the outer contour of a stack or protrusions in positions corresponding to the relief holes at a plurality of stages, shapes component members having a predetermined outer contour by non-separating indentation machining into a state where at least part of the outer contour thereof is locked to the material to be machined, and successively presses out and stacks the component members, passes the projections through the relief holes in the lower component member(s), and welds the protrusions to another component member in a non-adjacent state for stack and integration in the final stage of the progressive feeding of the material to be machined has conventionally been disclosed (see Patent Literature 1).

CITATION LIST

Patent Literature

Patent Literature 1: JP2002-45937A
Patent Literature 2: JP2000-263148A

DISCLOSURE OF THE INVENTION

Problems to be Solved by the Invention

An object of the present invention is to provide a stacking apparatus and a stack manufacturing system having even higher accuracy and productivity.

Means for Solving the Problems

A stacking apparatus of one embodiment according to the present invention includes:
a stage unit on which a first material to be stacked and a second material to be stacked are stacked and placed;
a sandwiching member that is vertically movable with respect to the stage unit, and between which and the stage unit the first material to be stacked and the second material to be stacked are sandwiched; and
a press member that is vertically movable with respect to the sandwiching member and simultaneously presses the first material to be stacked and the second material to be stacked.

A stack manufacturing system of one embodiment according to the present invention includes:
the stacking apparatus;
a first machining unit that machines the first material to be stacked; and
a second machining unit that machines the second material to be stacked.

In a stack manufacturing system of one embodiment according to the present invention,
the first machining unit performs non-separating indentation machining by which at least part of an outer contour of a first stack to be stamped out of the first material to be stacked by the press member is shaped in a state of being locked to a first scrap portion of the first material to be stacked other than the first stack, and
the second machining unit performs non-separating indentation machining by which at least part of an outer contour of a second stack to be stamped out of the second material to be stacked by the press member is shaped in a state of being locked to a second scrap portion of the second material to be stacked other than the second stack.

A stack manufacturing system of one embodiment according to the present invention where a direction in which the first machining unit conveys the first material to be stacked and a direction in which the second machining unit conveys the second material to be stacked are radially arranged about the stage unit.

Advantages of the Invention

According to the present invention, a stacking apparatus and a stack manufacturing system having high accuracy and productivity can be provided.

BRIEF DESCRIPTION OF THE DRAWINGS

FIG. 10 is a diagram showing a stack stacked by the stacking apparatus of one embodiment according to the present invention.

BEST MODE FOR CARRYING OUT THE INVENTION

Figure 1:
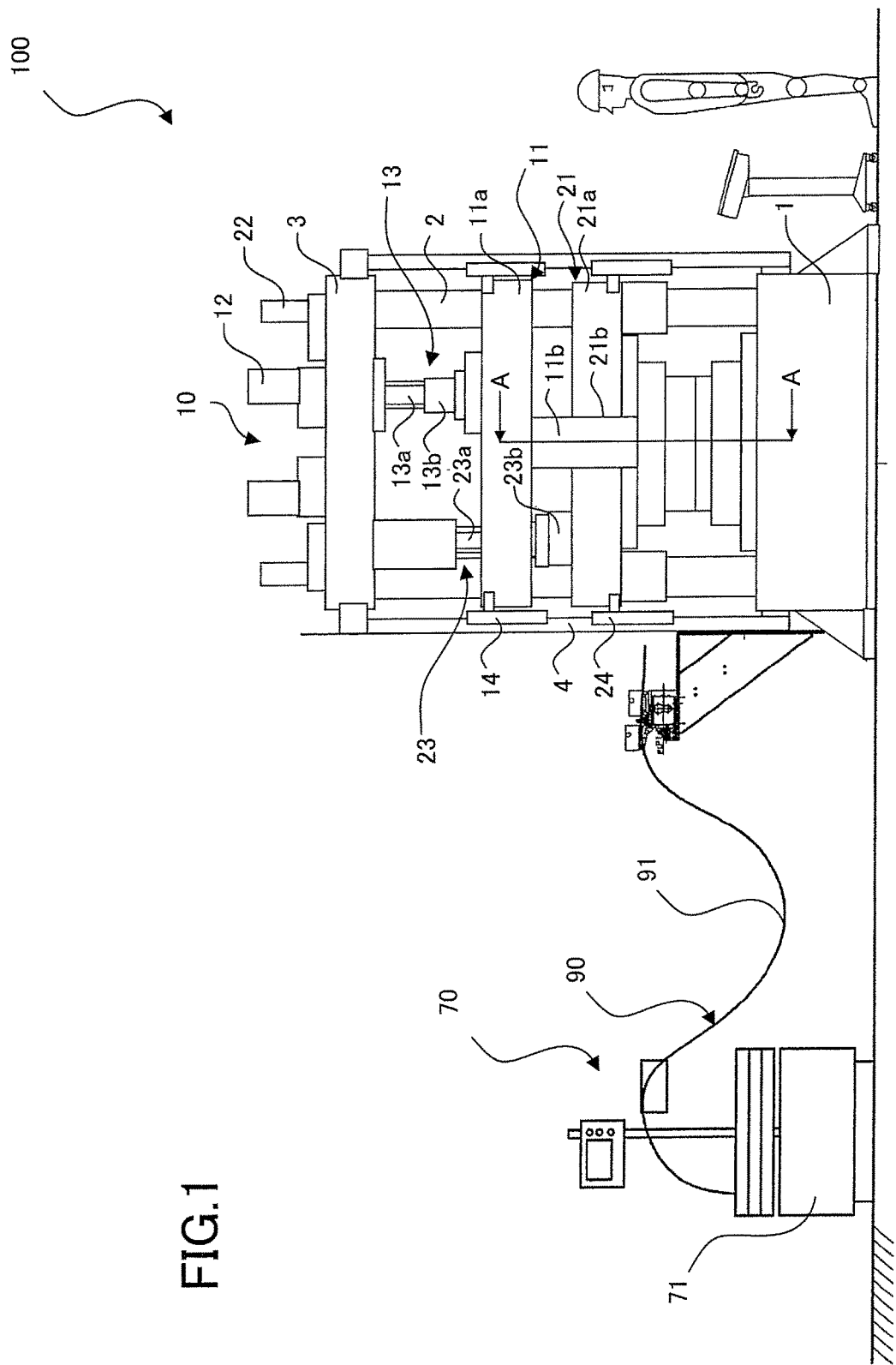
FIG. 1 is a front view showing one embodiment of a stack manufacturing system.
Figure 2:
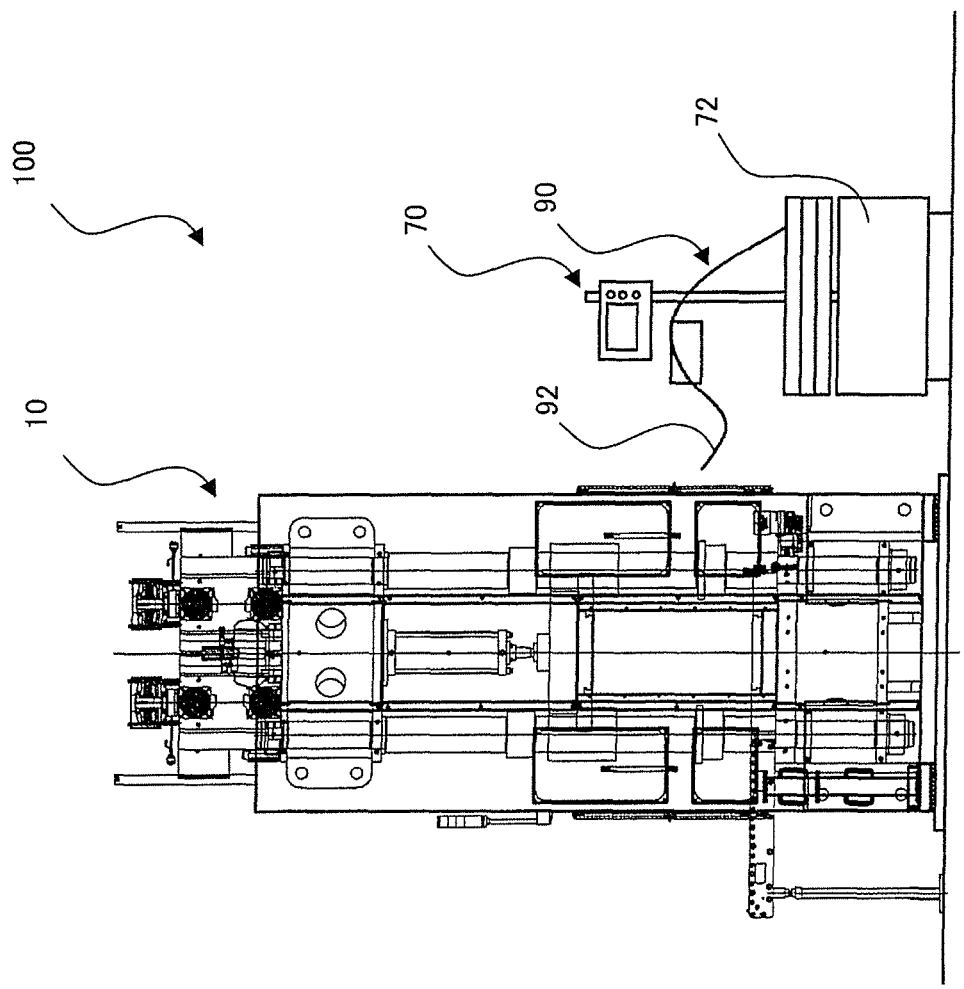
FIG. 2 is a side view showing one embodiment of the stack manufacturing system.
Figure 3:
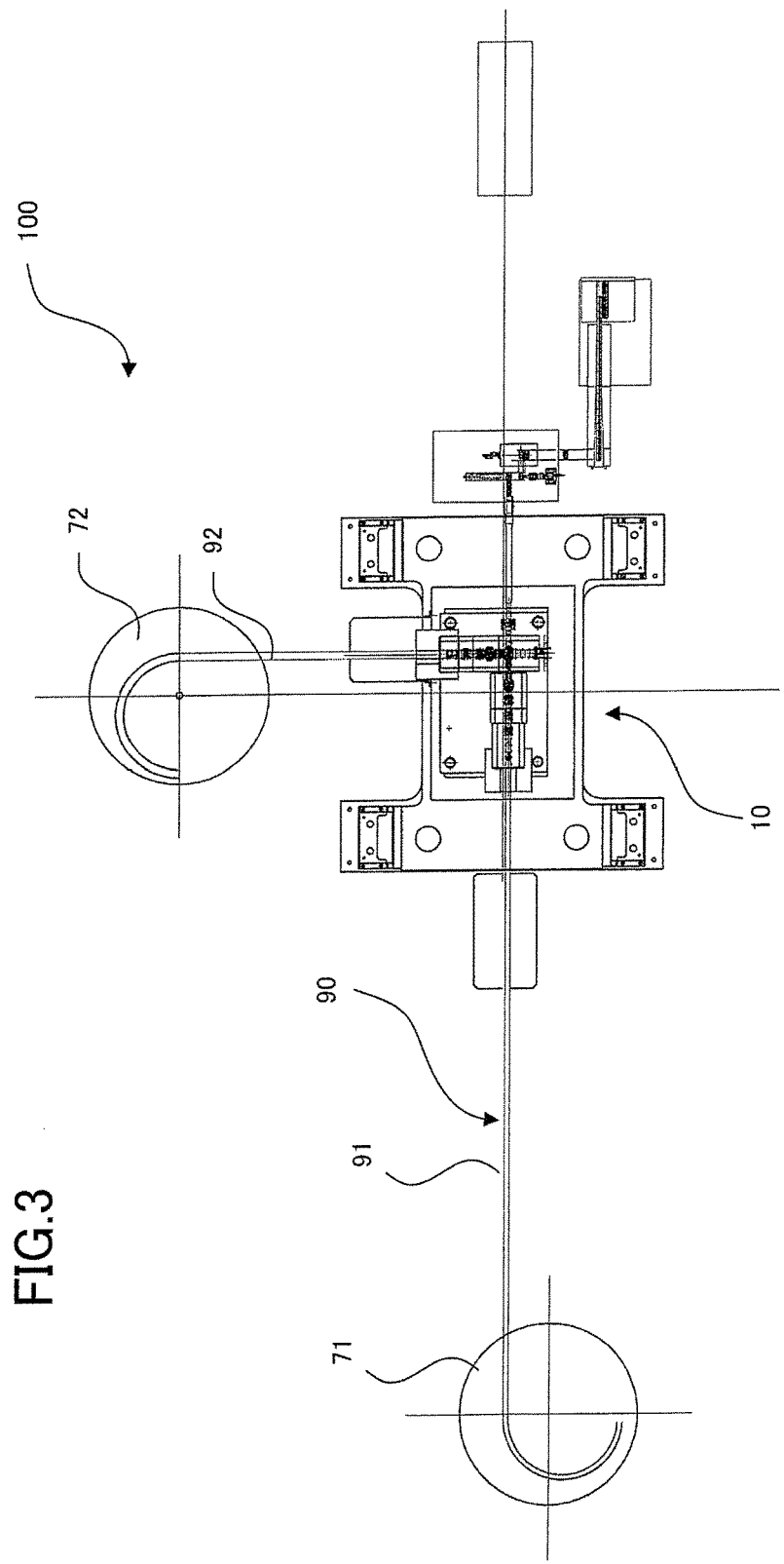
FIG. 3 is a plan view showing one embodiment of the stack manufacturing system.

FIG. 1 is a front view showing one embodiment of a stack manufacturing system. FIG. 2 is a side view showing one embodiment of the stack manufacturing system. FIG. 3 is a plan view showing one embodiment of the stack manufacturing system.

The stack manufacturing system 100 includes a stacking apparatus 10 and to-be-stacked material installation units 70.

The to-be-stacked material installation units 70 are parts in which unprocessed materials to be stacked 90 are installed. The to-be-stacked material installation units 70 of the present embodiment use disk-like members around the outer peripheries of which the unprocessed materials to be stacked 90 are wound in a coil form.

As for the number of to-be-stacked material installation units 70, at least two to-be-stacked material installation units 70 have only to be provided according to a stack structure of the materials to be stacked 90. For example, if two members are simultaneously stamped out to form a stack, two to-be-stacked material installation units 70 may be used. If three members are simultaneously stamped out to form a stack, three to-be-stacked installation units 70 may be used.

Note that the stack manufacturing system 100 may include a not-shown machining unit that machines part of a material to be stacked 90 in advance after the material to be stacked 90 is fed from a to-be-stacked material installation unit 70 and before stacked in the stacking unit 10. The machining unit is a unit that machines the material to be stacked 90 fed from the to-be-stacked material installation unit 70. Like the techniques described in Patent Literature 1 and Patent Literature 2, the machining unit progressively machines the fed material to be stacked 90. A processing machine of the machining unit is not limited to a press machine and may include a cutting machine and the like.

Next, the stacking apparatus 10 will be described.

The stacking apparatus 10 includes a bed 1, support posts 2, a crown 3, scaled posts 4, an inner slide 11 serving as a first slide, inner motors 12 serving as first-side driving sources, inner ball screws 13 serving as first-side feeding members, inner linear scales 14 serving as first-side position detection members, an outer slide 21 serving as a second slide, outer motors 22 serving as second-side driving sources, outer ball screws 23 serving as second-side feeding members, and outer linear scales 24 serving as second-side position detection members.

The bed 1 is a member serving as a base for placing the stacking apparatus 10 on the ground. The support posts 2 are posts extending upward from the bed 1. The present embodiment includes four support posts 2, which are arranged at the respective four corners of the bed 1. The crown 3 is placed on the support posts 2, and the inner motors 12 and the outer motors 22 are placed thereon. The bed 1, the support posts 2, and the crown 3 constitute a frame body of the stacking apparatus 10. Note that the number of support posts 2 is not limited to four. At least two support posts 2 have only to be included as long as the crown 3 can be supported. The support posts 2 are not limited to columnar ones and may be plate-like ones.

The inner slide 11 includes a stage-like portion 11a which is movably attached to the support posts 2, and a protrusion 11b which extends downward from the stage-like portion 11a. In the present embodiment, the four corners of the stage-like portion 11a are slidably arranged on the support posts 2, and the protrusion 11b is arranged to extend downward from the center of the stage-like portion 11a.

The inner motors 12 are placed on the crown 3 and drive the inner ball screws 13. The inner ball screws 13 include screw shafts 13a and nut units 13b. The screw shafts 13a penetrate through the crown 3 and are coupled to the output shafts of the inner motors 12. The nut units 13b are attached to the inner slide 11 and contain not-shown circulating steel balls.

The present embodiment includes four inner motors 12 and four inner ball screws 13 corresponding to the four corners of the crown 3 and the inner slide 11. The four inner motors 12 and inner ball screws 13 operate independent of each other. Note that the numbers of inner motors 12 and inner ball screws 13 are not limited to four. At least two inner motors 12 and inner ball screws 13 may be included.

The inner linear scales 14 read the scaled posts 4 to measure the height at which the inner slide 11 is positioned with respect to the bed 1. The present embodiment includes four scaled posts 4 corresponding to the four corners of the inner slide 11. Note that at least two inner linear scales 14 may be included.

The outer slide 21 includes a stage-like portion 21a which is movably attached to the support posts 2 under the inner slide 11, and a hole portion 21b through which the protrusion 11b of the inner slide 11 movably penetrates in a vertical direction of the stage-like portion 21a. In the present embodiment, the four corners of the stage-like portion 21a are slidably arranged on the support posts 2. The hole portion 21b is formed in the center of the stage-like portion 21a so that the protrusion 11b of the inner slide 11 slidably penetrates through the hole portion 21b.

The outer motors 22 are placed on the crown 3 and drive the outer ball screws 23. The outer ball screws 23 include screw shafts 23a and nut units 23b. The screw shafts 23 penetrate through the crown 3 and the inner slide 11 and are coupled to the output shafts of the outer motors 22. The nut units 23b are attached to the outer slide 21 and contain not-shown circulating steel balls.

The present embodiment includes four outer motors 22 and four outer ball screws 23 corresponding to the four corners of the crown 3 and the outer slide 21. The four outer motors 22 and outer ball screws 23 operate independent of each other. Note that the numbers of outer motors 22 and outer ball screws 23 are not limited to four. At least two outer motors 22 and outer ball screws 23 may be included.

The outer linear scales 24 read the scaled posts 4 to measure the height at which the outer slide 21 is positioned with respect to the bed 1. The present embodiment includes four outer linear scales 24 corresponding to the four corners of the outer slide 21. Note that at least two outer linear scales 24 may be included.

The scaled posts 4 are vertically attached at one end to the bed 1 and at the other to the crown 3. In the present embodiment, the scaled posts 4 are attached at four corners outside the inner slide 11 and the outer slide 21. The scaled posts 4 are used in common by the inner linear scales 14 and the outer linear scales 24. The scaled posts 4, the inner linear scales 14, and the outer linear scales 24 are therefore provided in the same numbers.

In the present embodiment, an operation for press machining an article to be molded is automatically repeated. The inner slide 11 and the outer slide 21 can be maintained in a horizontal state with high accuracy at every stage of each press machining operation during an actual press machining period.

More specifically, at every stage in the process of each single shot of press machining during a teaching machining period prior to an actual press machining period, (i) the measurement results of the inner linear scales 14 are taken in and the driving energy supplied to each of the four inner motors 12 for driving the inner slide 11 is adjusted and determined so that the inner slide 11 can be horizontally maintained, and information about the driving energy supplied to each of the inner motors 12 in each stage is stored into a storage device, and (ii) the measurement results of the outer linear scales 24 are taken in and the driving energy supplied to each of the four outer motors 22 for driving the outer slide 21 is adjusted and determined so that the outer slide 21 can be horizontally maintained, and information about the driving energy supplied to each of the outer motors 22 in each stage is stored into the storage device.

Next, at each stage in the process of each single shot of press machining during an actual machining period, (i) driving energy is supplied to each of the inner motors 12 for driving the inner slide 11 based on the stored information, and (ii) driving energy is supplied to each of the outer motors 22 for driving the outer slide 21 based on the stored information.

In the present embodiment, such control is performed to maintain the inner slide 11 and the outer slide 21 in a horizontal state with high accuracy at every stage of each single press machining operation. As a result, the clearances between the sliding holes in the four corners of the inner slide 11 and the support posts 2 can be determined to be 0.10 mm to 0.25 mm.

Next, a stacking unit 50 will be described.

Figure 4:
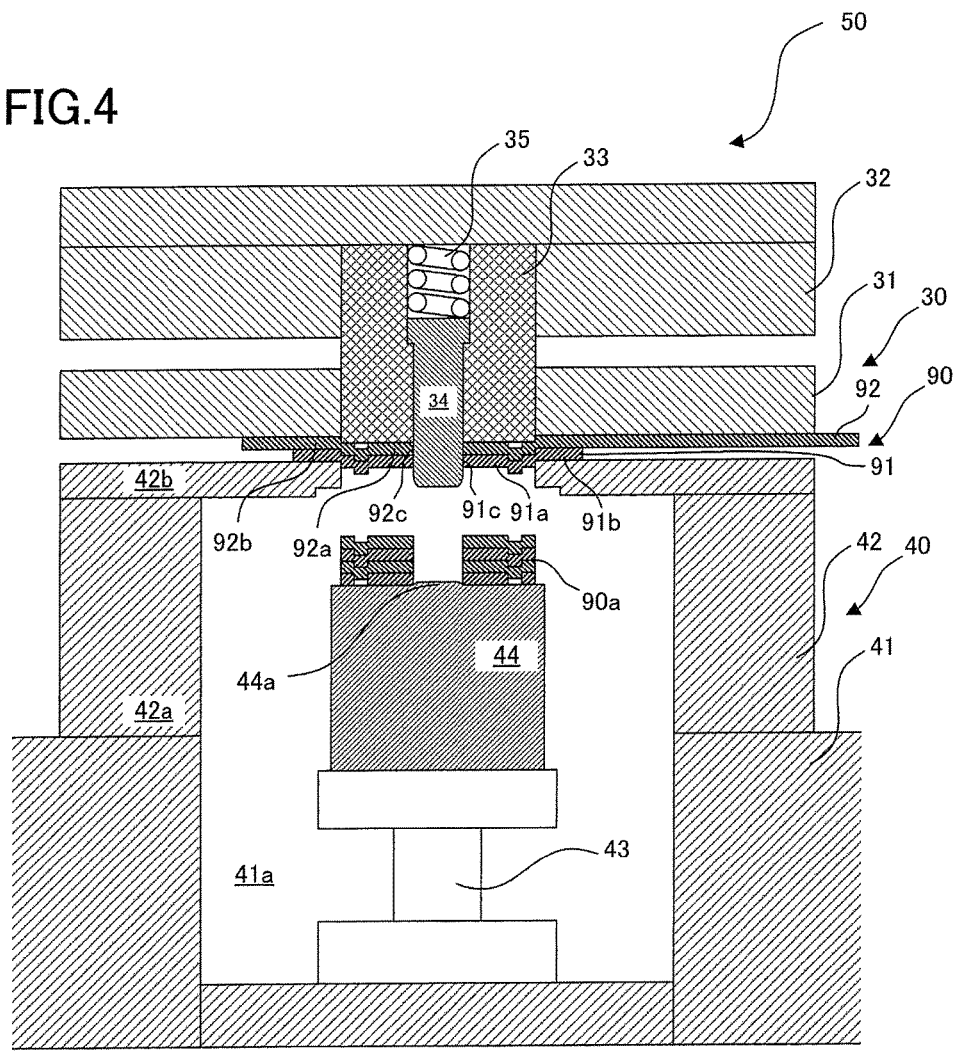
FIG. 4 is a diagram showing an A-A section near a stacking unit in FIG. 1 of one embodiment according to the present invention.

FIG. 4 is a diagram showing an A-A section in FIG. 1 of one embodiment according to the present invention.

A stage unit 40 includes a table 41, a support stage 42, an actuator 43, and a guide base 44. The table 41 is a member having a horizontal flat surface for the support stage 42 to be installed on.

The support stage 42 is installed on the table 41. The support stage 42 includes a support cylinder 42a of circular cylindrical shape or rectangular cylindrical shape, and a flat plate unit 42b which is installed on the support cylinder 42a and has an opening in the center. The actuator 43 has an extendable structure and is installed on the table 41. In the present embodiment, the actuator 43 is installed in a hole portion 41a formed in the table 41 to increase the operating distance by which the actuator 43 extends and contracts.

The guide base 44 is installed on the actuator 43. The guide base 44 can be vertically moved by the actuator 43. A protrusion 44a is formed on the top surface of the guide base 44. The protrusion 44a protrudes by a dimension smaller than the thickness of a first material to be stacked 91.

As described above, the guide base 44 can be vertically moved by the actuator 43. Even if the number of layers of the stack 90a stacked on the guide base 44 increases, the position of the guide base 44 can be adjusted by operating the actuator 43 to extend or contract according to the number of layers of the stack 90a on the guide base 44. This enables accurate stack of the stack 90a.

A pressurizing unit 30 includes: a sandwiching member 31 which corresponds to the outer slide 21 in FIG. 1; a pressurizing member 32 which corresponds to the stage-like portion 11a of the inner slide 11 in FIG. 1; a press member 33 which corresponds to the protrusion 11b of the inner slide 11 in FIG. 1; a guide pin 34; and a spring 35 which serves as an elastic member.

The sandwiching member 31 can be moved up and down by the outer motors 22 shown in FIG. 1. The sandwiching member 31 and the support stage 42 can sandwich a first scrap portion 91b of the first material to be stacked 91 and a second scrap portion 92b of a second material to be stacked 92 therebetween. The pressurizing member 32 holds the press member 33. The pressurizing member 32 and the press member 33 can be integrally moved up and down with respect to the sandwiching member 31 by the inner motors 12. The press member 33 presses the first material to be stacked 91 and the second material to be stacked 92 to simultaneously stamp out a first stack 91a and a second stack 92a from the first scarp portion 91b and the second scrap portion 92b. The guide pin 34 is inserted through the press member 33 and can move up and down with respect to the press member 33. The guide pin 34 is passed through a first hole 91c and a second hole 92c machined in advance in the first material to be stacked 91 and the second material to be stacked 92 and guides the first material to be stacked 91 and the second stack 92 pressed and cut off by the press member 33. The spring 35 biases the guide pin 34 against the pressurizing member 32 from above, and can elastically support the guide pin 34 when the pressurizing member 32 is pressed from below.

With such a structure, the guide pin 34 can accurately guide the first stack 91a and the second stack 92a that are simultaneously pressed and integrally stamped out of the first material to be stacked 91 and the second material to be stacked 92 by the press member 33 onto the stack 90a which has already been placed and integrated on the guide base 44. Note that the horizontal cross section of the guide pin 34 is preferably shaped to correspond to the first hole 91c of the first stack 91a and the second hole 92c of the second stack 92a. If the horizontal cross section of the guide pin 34 is configured to have a shape corresponding to the first hole 91c of the first stack 91a and the second hole 92c of the second stack 92a, the guide pin 34 can more accurately guide the first stack 91a pressed and stamped out of the first material to be stacked 91 and the second stack 92a pressed and stamped out of the second material to be stacked 92 by the press member 33. Note that the guide pin 34 does not necessarily need to be provided.

Moreover, when stacking the first stack 91a and the second stack 92a onto the stack 90a which has already been stamped out and placed on the base guide 44, the spring 35 can reduce the impact of collision of the guide pin 34 with the guide base 44 or the stack 90a.

Note that the horizontal cross section of the protrusion 44a on the top surface of the guide base 44 is preferably shaped to correspond to the first hole 91c of the first stack 91a and the second hole 92c of the second stack 92a. If the protrusion 44a is thus configured to have a shape corresponding to the first hole 91c of the first stack 91a and the second hole 92c of the second stack 92a, the guide base 44 can stably hold the stamped first stack and second stack 92a on the top surface.

Figure 5:
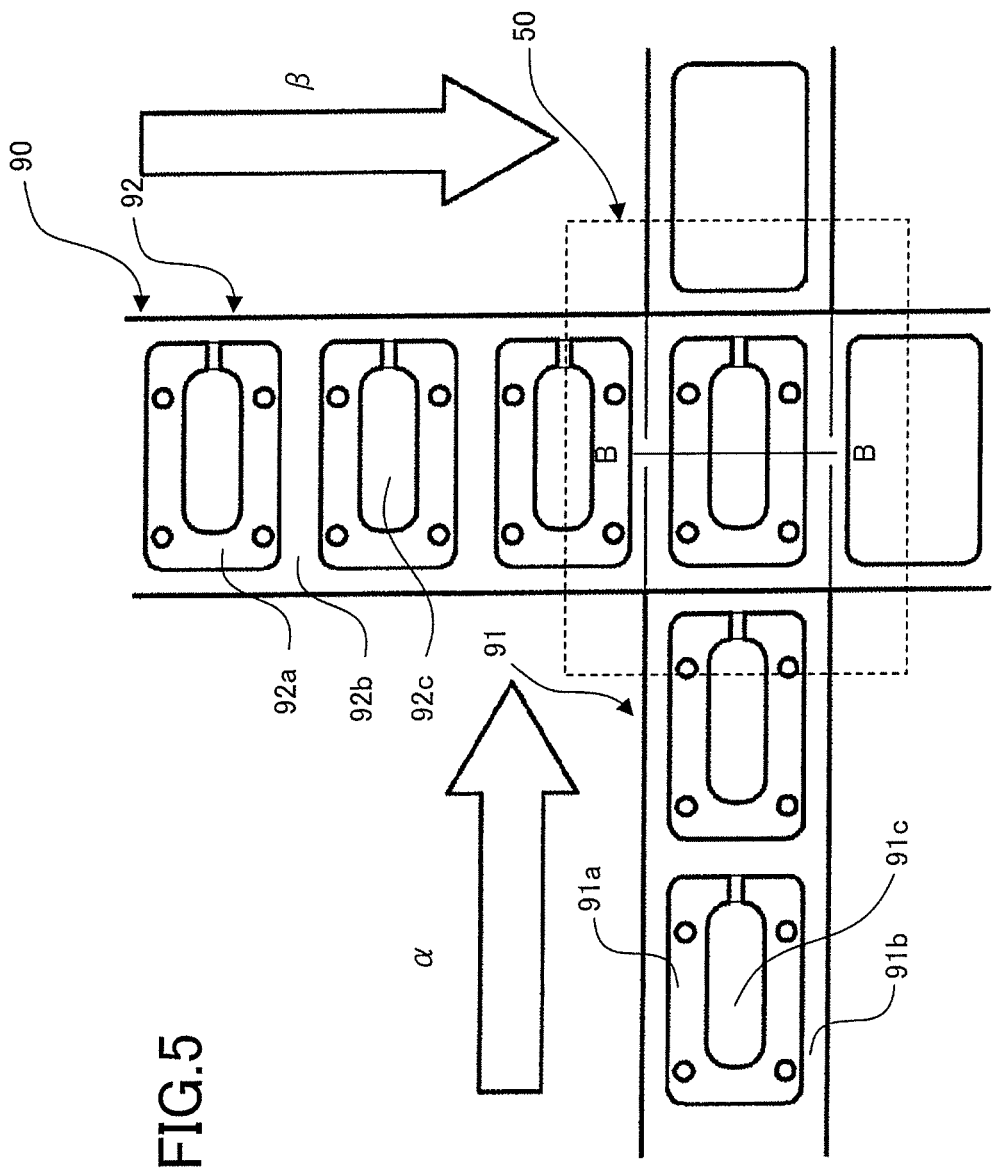
FIG. 5 is a diagram showing a first material to be stacked 91 and a second material to be stacked 92 near the stacking unit of one embodiment according to the present invention.

FIG. 5 is a diagram showing the first material to be stacked 91 and the second material to be stacked 92 near the stacking unit of one embodiment according to the present invention.

The stack manufacturing system of the present embodiment is arranged so that the first material to be stacked 91 and the second material to be stacked 92 cross each other at right angles, with the vicinity of the stacking unit 50 of the stacking apparatus 10 as the intersection.

The first material to be stacked 91 is conveyed to the stacking apparatus 10 in the direction of a first arrow α. The first material to be stacked 91 may be machined by a not-shown machining unit in advance before conveyed to the stacking apparatus 10. For example, the first stack 91a is preferably half-punched with respect to the first scrap portion 91b in advance, with the first hole 91c half-punched or punched out.

The second material to be stacked 92 is conveyed to the stacking apparatus 10 in the direction of a second arrow β. The second material to be stacked 92 may be machined by a not-shown machining unit in advance before conveyed to the stacking apparatus 10. For example, the second stack 92a is preferably half-punched with respect to the second scrap portion 92b in advance, with the second hole 92c half-punched or punched out.

The first material to be stacked 91 and the second material to be stacked 92 are conveyed so that the first stack 91a and the second stack 92a vertically overlap each other in the stacking unit 50 of the stacking apparatus 10. Then, the first stack 91a and the second stack 92a are almost simultaneously stamped out and integrated from the first scrap portion 91b and the second scrap portion 92b. The first scarp portion 91b and the second scrap portion 92b from which the first stack 91a and the second stack 92a have been stamped out are conveyed on and discarded.

Next, a method for operating the stacking apparatus 10 of one embodiment according to the present invention will be described.

Figure 6:
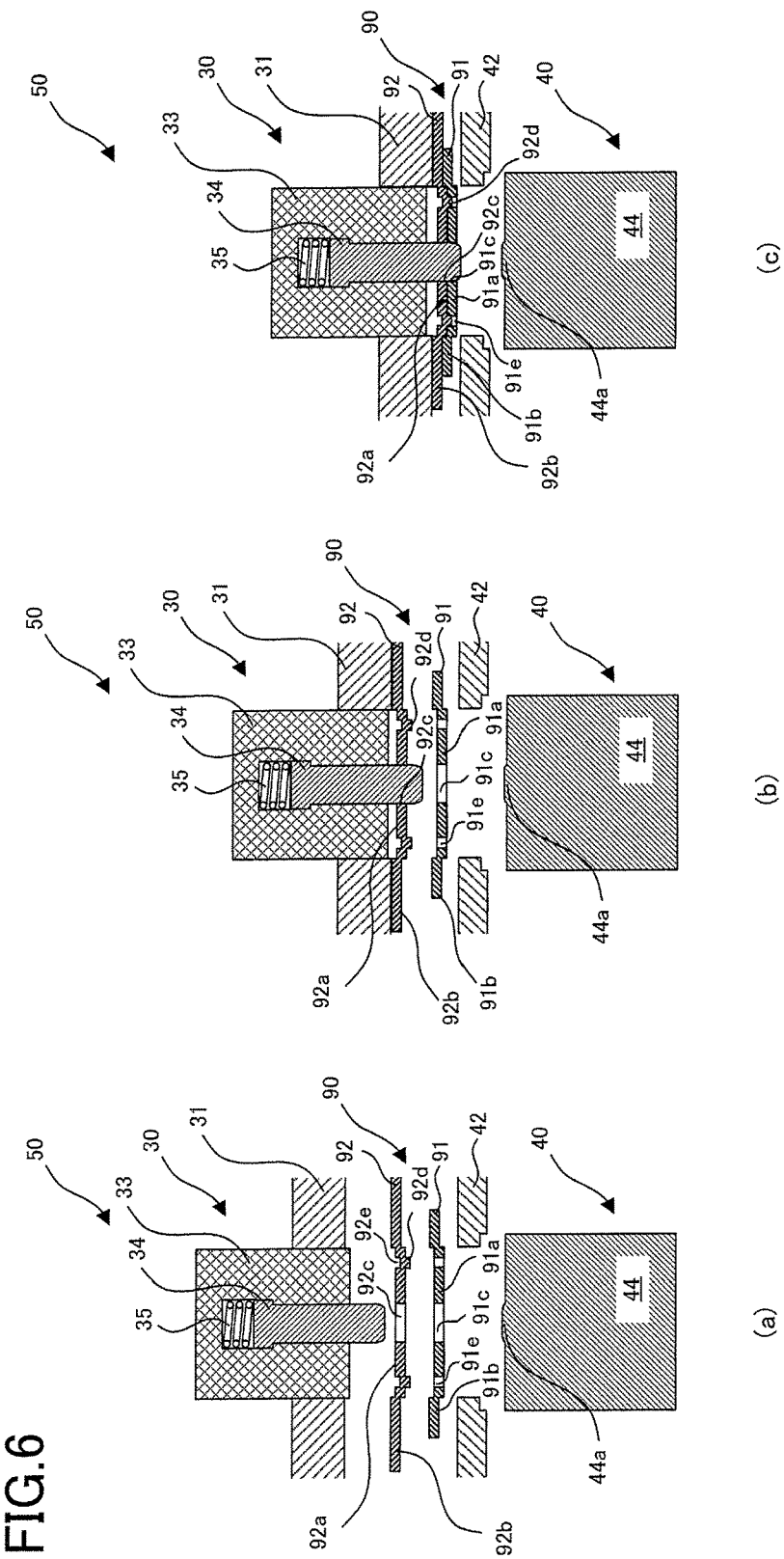
FIG. 6 is a diagram showing an operation of a stacking unit 50 of one embodiment according to the present invention.
Figure 7:
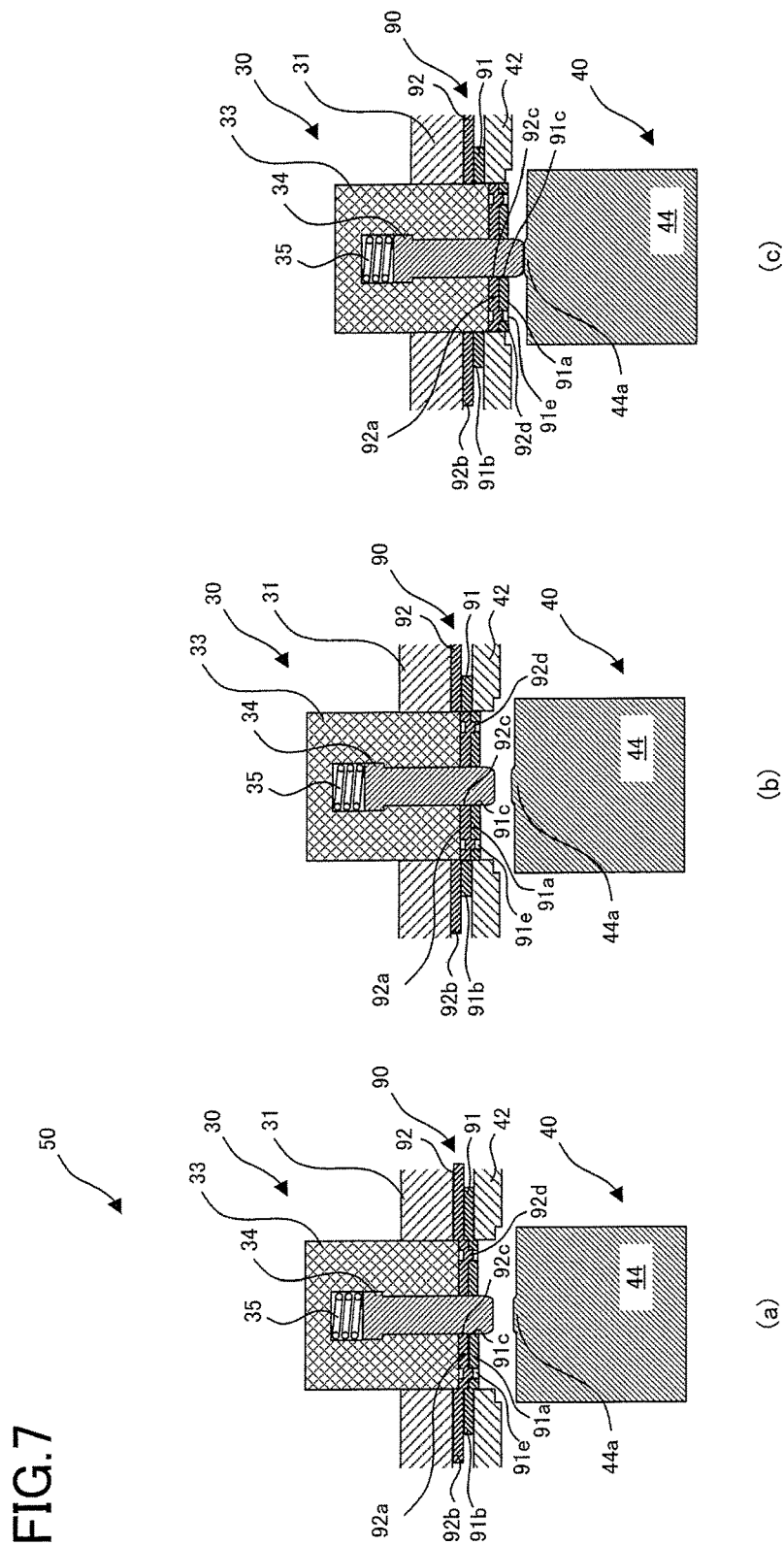
FIG. 7 is a diagram showing an operation of the stacking unit 50 of one embodiment according to the present invention.
Figure 8:
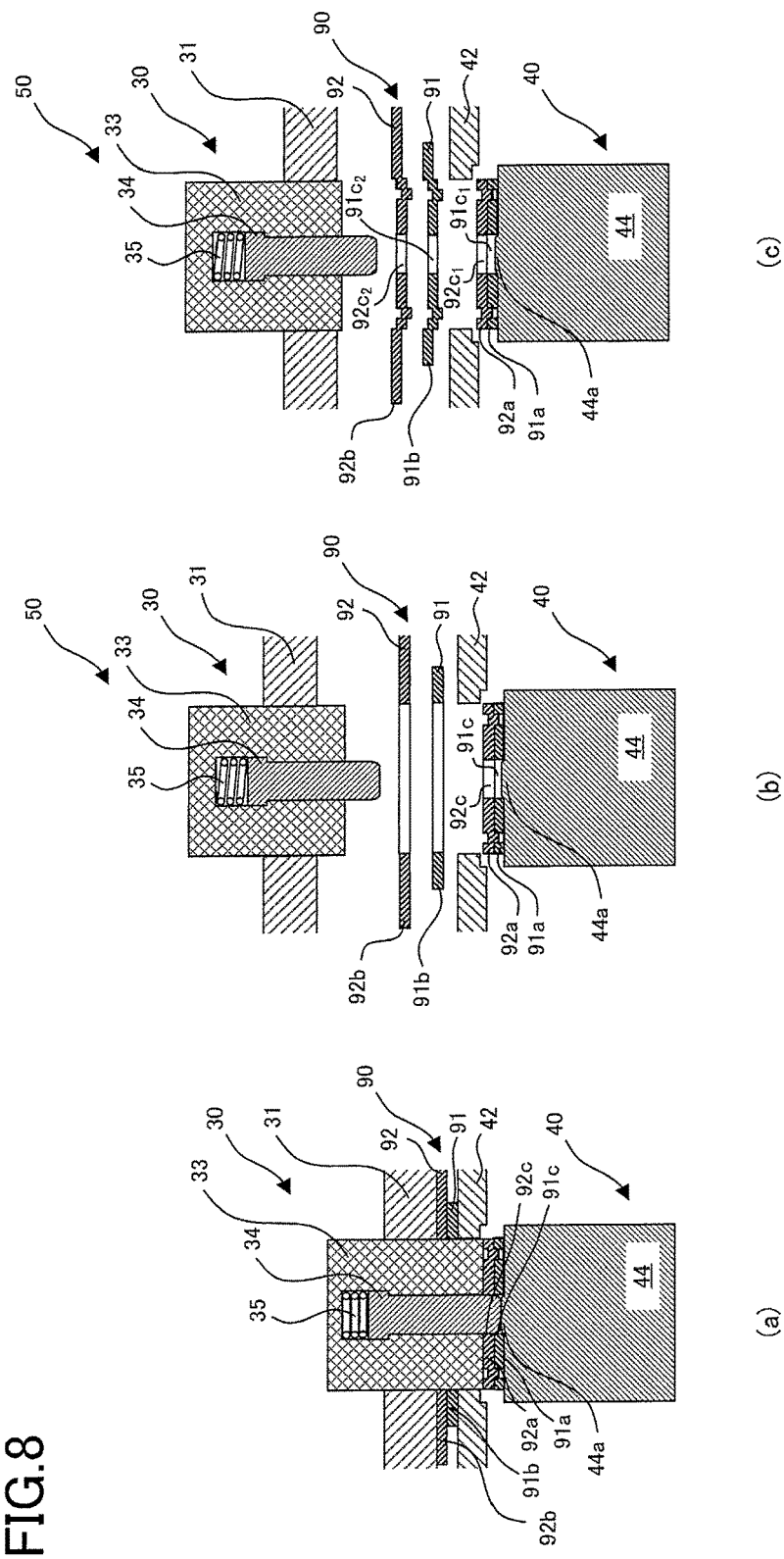
FIG. 8 is a diagram showing an operation of the stacking unit 50 of one embodiment according to the present invention.
Figure 9:
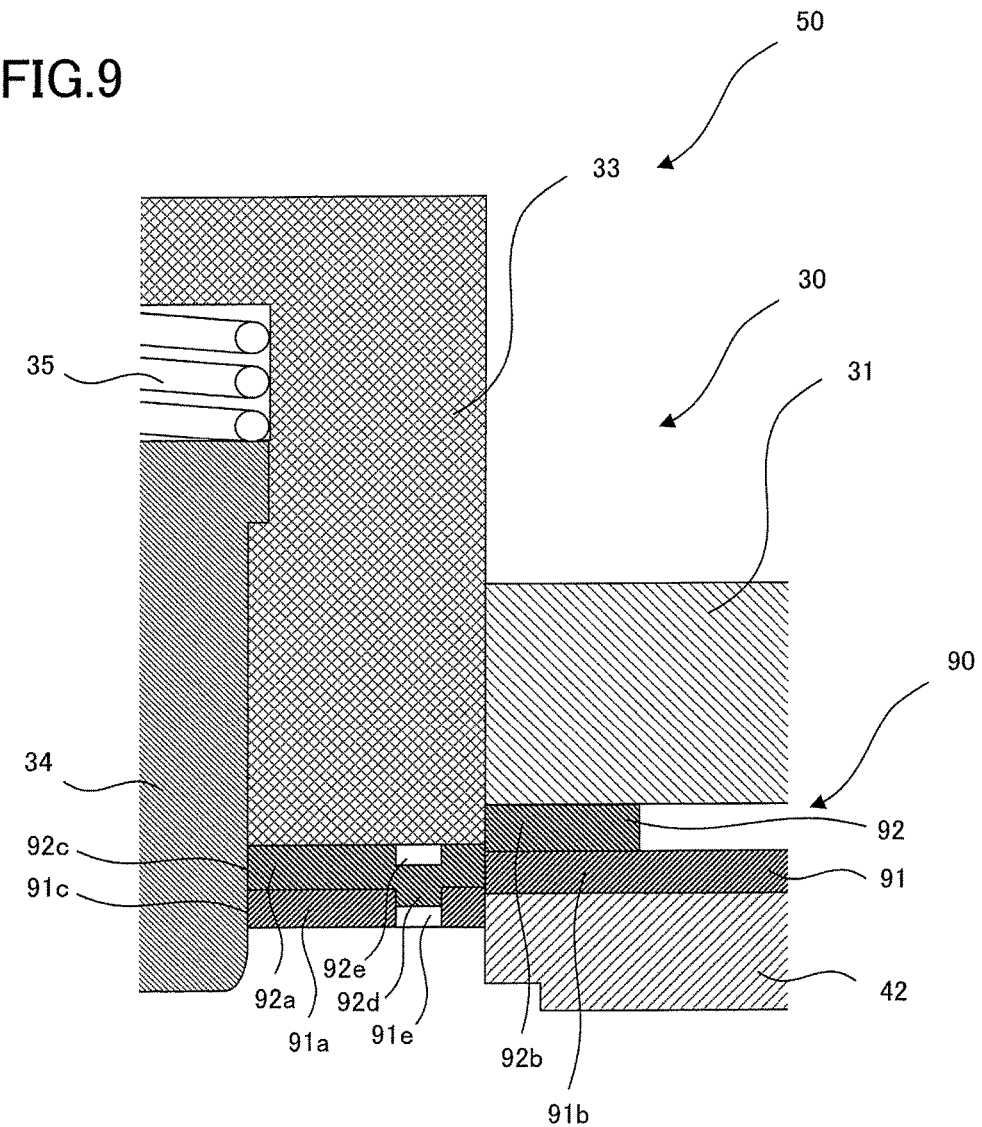
FIG. 9 is an enlarged view of part of the stacking unit 50.

FIGS. 6, 7, and 8 are diagrams showing an operation of the stacking unit 50 of one embodiment according to the present invention. FIG. 9 is an enlarged view of part of the stacking unit 50.

FIG. 6A shows a state where the first stack 91a of the first material to be stacked 91 and the second stack 92a of the second material to be stacked 92 are conveyed to the stacking unit 50. As shown in FIG. 5, the first material to be stacked 91 and the second material to be stacked 92 are conveyed in orthogonal directions. The first material to be stacked 91 and the second material to be stacked 92 are then positioned so that the first hole 91c of the first stack 91a and the second hole 92c of the second stack 92a overlap under the guide pin 34.

At this point in time, the first stack 91a of the first material to be stacked 91 has protrusions 91d and recesses 91e. The second stack 92a of the second material to be stacked 92 has protrusions 92d and recesses 92e. Note that the first layer of the first stack 91a does not need to have the protrusions 91d. The first material to be stacked 91 and the second material to be stacked 92 are preferably in a non-separating indentation machining state so-called half-pressed where at least part of the outer contours of the first stack 91a and the second stack 92a is shaped in a state of being locked to the first scrap portion 91b and the second scrap portion 92b.

FIG. 6B shows a state where the pressurizing unit 30 is moved down, the sandwiching member 31 is in contact with the second scrap portion 92b of the second material to be stacked 92, and the guide pin 34 is inserted through the second hole 92c of the second material to be stacked 92.

FIG. 6C shows a state where the pressurizing unit 30 is moved down further, the second scrap portion 92b is in contact with the first scrap portion 91b of the first material to be stacked 91, and the guide pin 34 is inserted through the second hole 92c of the second material to be stacked 92 and the first hole 91c of the first material to be stacked 91. At this point in time, the protrusions 92d of the second stack 92a do not need to be coupled to the recesses 91e of the first stack 91a.

FIG. 7A shows a state where the pressurizing unit 30 is moved down further and the first scrap portion 91b of the first material to be stacked 91 is in contact with the support stage 42. In other words, the first scrap portion 91b of the first material to be stacked 91 and the second scrap portion 92b of the second material to be stacked 92 are stacked and sandwiched between the sandwiching member 31 and the support stage 42. In this state, the press member 33 is preferably in contact with or about to make contact with the second stack 92a.

FIG. 7B shows a state where the pressurizing unit 30 is moved down further and the first stack 91a and the second stack 92a are cut off by the press member 33.

FIG. 9 is an enlarged view of part of FIG. 7B.

As shown in FIG. 9, the first stack 91a and the second stack 92a are cut off by the press member 33 in such a state that the press member 33 punches the second stack 92a and the second stack 92a punches the first stack 91a. The support stage 42 serves as a die for the first stack 91a, and the first scrap portion 91b serves as a die for the second stack 92a. In this phase, the protrusion 92d of the second stack 92a and the recess 91e of the first stack 91a are coupled to integrate the first stack 91a and the second stack 92a.

FIG. 7C shows a state where the pressurizing unit 30 is moved down further, the first stack 91a and the second stack 92a are completely cut off by the press member 33, and the guide pin 34 is in contact with the guide base 44.

FIG. 8A shows a state where the pressurizing unit 30 is moved down further and the integrated first stack 91a and second stack 92a are in contact with the guide base 44. In such a state, the guide pin 34 is pressed by the guide base 44. The spring 35 can contract to absorb the movement of the guide pin 34.

FIG. 8B is a state where the pressurizing member 30 is moved up. The first stack 91a and the second stack 92a stamped out and integrated by the press member 33 remain placed on the guide base 44. The first scrap portion 91b of the first material to be stacked 91 and the second scrap portion 92b of the second material to be stacked are left with the first stack 91a and the second stack 92a punched out, respectively.

FIG. 8C shows a state where a new first stack 91a of the first material to be stacked 91 and a new second stack 92a of the second material to be stacked 92 are conveyed to under the press member 33. Stack is then performed as in the steps of FIG. 6A and later.

Stack is continued, and when a first stack 91a having no protrusions 91a as shown in FIG. 7A is conveyed in, the stack 90a is completed and discharged. New stack is then started.

FIG. 10 is a diagram showing a stack stacked by the stacking apparatus of one embodiment according to the present invention.

The steps shown in FIGS. 6 to 8 are performed on the first stack 91a and the second stack 92a four times to complete the stack 90a shown in FIG. 10. A first stack $91a_1$ and a second stack $92a_1$ are portions stacked by the first press. A first stack $91a_2$ and a second stack $92a_2$ are portions stacked by the second press. A first stack $91a_3$ and a second stack $92a_3$ are portions stacked by the third press. A first stack $91a_4$ and a second stack $92a_4$ are portions stacked by the fourth press. The numbers of first stacks 91a and second stacks 92a are not limited to those of the present embodiment. Any numbers of stacks may be stacked.

Next, a method for manufacturing a stack by the stack manufacturing system will be described.

Figure 11:
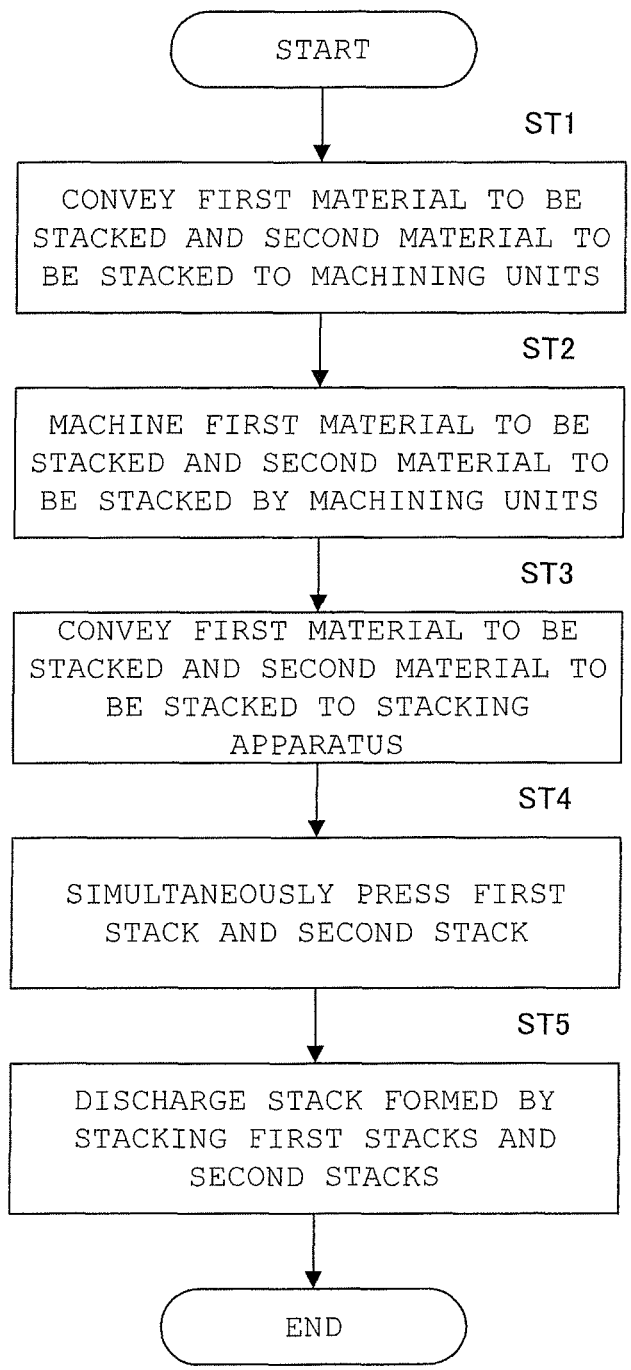
FIG. 11 is a flowchart showing steps of the stack manufacturing system of one embodiment according to the present invention.

FIG. 11 is a flowchart showing the steps of the stack manufacturing system of one embodiment according to the present invention.

Initially, in step 1, the first material to be stacked 91 is fed from the first to-be-stacked material installation unit 71 shown in FIG. 3 to a not-shown first machining unit, and the second material to be stacked 92 is fed from the second to-be-stacked material installation unit 72 shown in FIG. 3 to a not-shown second machining unit (ST1).

Next, in step 2, the first material to be stacked 91 is machined by the first machining unit, and the second material to be stacked 92 is machined by the second machining unit (ST2).

As described above, the final machining state of the first material to be stacked 91 in the first machining unit is preferably a non-separating indentation machining state so-called a half-punched state in which at least part of the outer contour of the first stack 91a is shaped in a state of being locked to the first scrap portion 91b. As described above, the final machining state of the second material to be stacked 92 in the second machining unit is preferably a non-separating indentation machining state so-called a half-punched state in which at least part of the outer contour of the second stack 92a is shaped in a state of being locked to the second scarp portion 92b.

Moreover, the first material to be stacked 91 is preferably machined to have a first hole 91a for the guide pin 33 to be inserted into. The second material to be stacked 92 is preferably machined to have a second hole 92c for the guide pin 33 to be inserted into.

Next, in step 3, the machined first material to be stacked 91 and second material to be stacked 92 are conveyed to the stacking apparatus 10 (ST3).

Note that the machining steps of the machining units do not need to be performed in order of the first machining unit and the second machining unit. The materials to be stacked have only to be conveyed to the stacking unit 50 in a previously machined state.

Next, in step 4, the stacking unit 50 simultaneously presses and integrally stamps out the first stack 91a and the second stack 92a for stack (ST4).

These steps 1 to 4 are performed as needed to stack a plurality of first stacks 91a and second stacks 92a. When a first stack 91a having no protrusions 91d as shown in FIG. 7A is conveyed in, the stack 90a is completed.

Finally, in step 5, the completed stack 90a shown in FIG. 10 is discharged (ST5).

Figure 12:
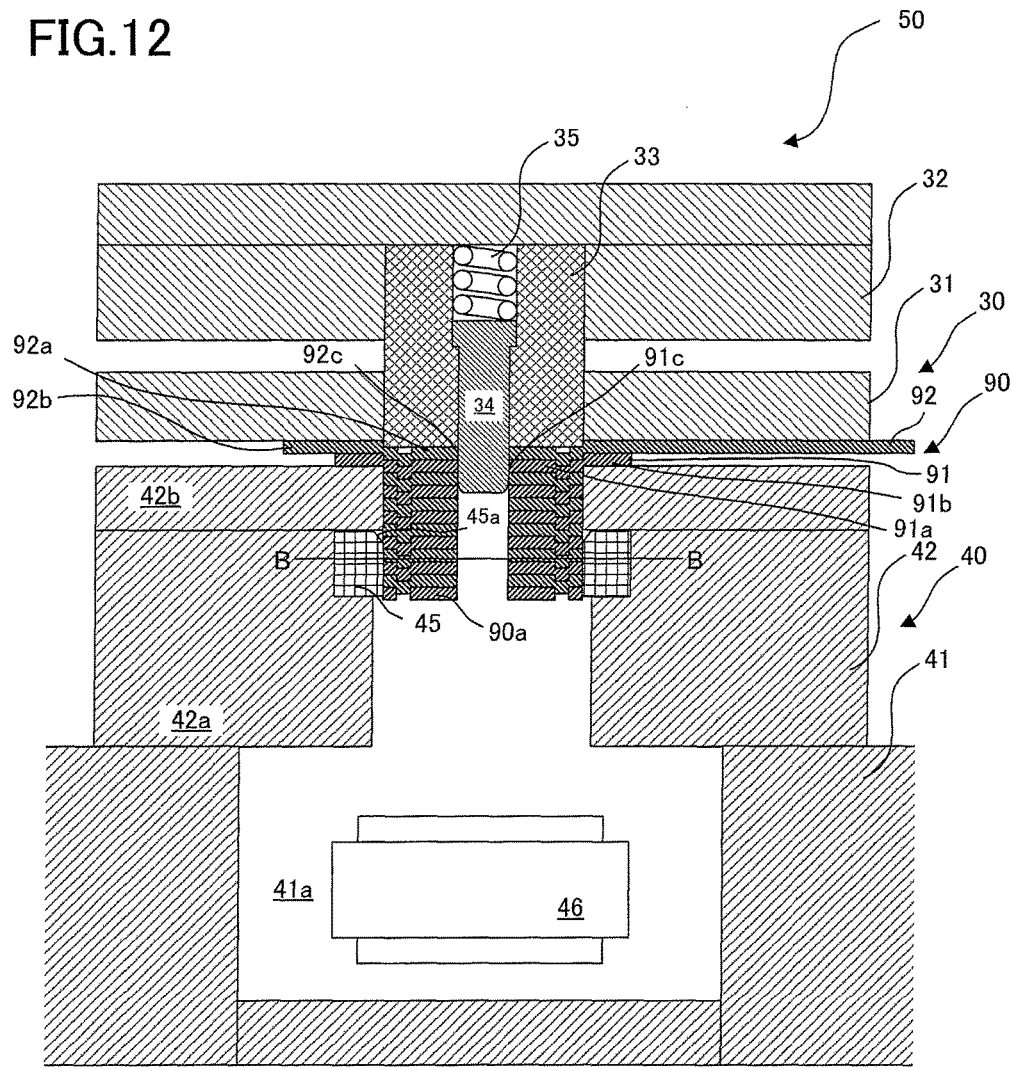
FIG. 12 is a diagram showing an A-A section near the stacking unit in FIG. 1 of another embodiment according to the present invention.
Figure 13:
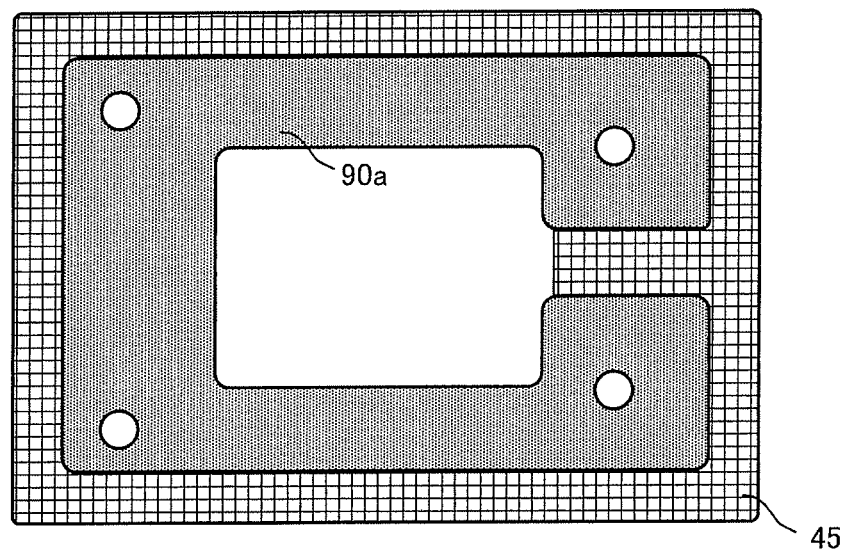
FIG. 13 is a view showing a B-B section of FIG. 12.

FIG. 12 is a diagram showing an A-A section near the stacking unit in FIG. 1 of another embodiment according to the present invention. FIG. 13 is a diagram showing a B-B section of FIG. 12.

The stacking apparatus 10 of the embodiment shown in FIG. 12 includes a structure to hold the stack 90a by a crimping ring 45 instead of the table 41. The stage unit 40 of the embodiment shown in FIG. 12 includes the table 41, the support stage 42, the crimping ring 45, and a belt conveyor 46.

The table 41 is a member having a horizontal flat surface for the support stage 42 to be installed on. The support stage 42 is installed on the table 41. The support stage 42 includes the support cylinder 42a of circular cylindrical shape or rectangular cylindrical shape, and the flat plate unit 42b which is installed on the support cylinder 42a and has an opening in the center.

As shown in FIG. 13, the crimping ring 45 is a member that is formed to the shape of the stack 90a to surround the outer periphery thereof. The crimping ring 45 is formed to be smaller than the inner dimensions of the flat plate unit 42b serving as a die by 0.005 mm or so on each side. The crimping ring 45 has a tapered portion 45a inside its upper part.

Consequently, as shown in FIG. 12, the stacked stack 90a fits to and is held by the crimping ring 45. Here, the crimping ring 45 having the tapered portion 45a structurally facilitates the stack 90a fitting into the crimping ring 45.

With such a structure, the first stack 91a and the second stack 92a that are simultaneously pressed and integrally stamped out of the first material to be stacked 91 and the second material to be stacked 92 by the press member 33 are stacked on the integral stack 90a which has already been stamped out, fitted to and been held by the crimping ring 45.

Stack is continued, and when a first stack 91a having no protrusions 91d as shown in FIG. 7A is conveyed and pressed, the stack 90a is completed. The next first stack 91a to be pressed, having no protrusions 91, is not able to be connected to the recesses 92e of the second stack 92a at the top of the completed stack 90a. The completed stack 90a therefore falls from the crimping ring 45 to the belt conveyor 46 and is conveyed on.

As described above, the stacking apparatus 10 of one embodiment includes: the stage unit 4 on which the first material to be stacked 91 and the second stack 92 are stacked and placed; the sandwiching member 11 that is vertically movable with respect to the stage unit 4, and between which and the stage unit 4 the first material to be stacked 91 and the second material to be stacked 92 are sandwiched; and the press member 13 that is vertically movable with respect to the sandwiching member 11 and simultaneously presses the first material to be stacked 91 and the second material to be stacked 92. The press member 33 can thus simultaneously press the first material to be stacked 91 and the second material to be stacked 92 to stack a plurality of materials to be stacked by one press. This can improve accuracy and productivity.

Moreover, the stack manufacturing system 100 of one embodiment includes the foregoing stacking apparatus 10, the first machining unit that machines the first material to be stacked 91, and the second machining unit that machines the second material to be stacked 92. The first stack 91a and the second stack 92a can thus be machined with different dimensions, in different shapes, and of different substances immediately before stack. This increases the degree of freedom in design, and enables prompt accommodation to changes in the dimensions, shapes, substances, and the like of the first stack 91a and the second stack 92a.

In the stack manufacturing system 100 of one embodiment, the first machining unit performs non-separating indentation machining by which at least part of the outer contour of the first stack 91a to be stamped out of the first material to be stacked 91 by the press member 33 is shaped in a state of being locked to the first scrap portion 91b of the first material to be stacked 91 other than the first stack 91a. The second machining unit performs non-separating indentation machining by which at least part of the outer contour of the second stack 92a to be stamped out of the second material to be stacked 92 by the press member 33 is shaped in a state of being locked to the second scrap portion 92b of the second material to be stacked 92 other than the second stack 92a. This can reduce the load when the press member 33 stamps out the first stack 91a and the second stack 92a, and can further improve accuracy.

In the stack manufacturing system 100 of one embodiment, the direction in which the first machining unit conveys the first material to be stacked 91 and the direction in which the second machining unit conveys the second material to be stacked 92 are radially arranged about the stage unit 40. This allows efficient operations and effective use of space.

Note that the present invention is not limited to such an embodiment. More specifically, while the description of the embodiment includes a lot of specific details for illustration, variations and modifications may be made to such details.

EXPLANATION OF REFERENCE SYMBOLS

100: stack manufacturing system
10: stacking apparatus
30: pressurizing unit
40: stage unit
50: stacking unit
70: to-be-stacked material installation units
90: material to be stacked

The invention claimed is:

1. A stacking apparatus comprising:
a stage unit on which a first material to be stacked and a second material to be stacked are stacked and placed;
a sandwiching member that is vertically movable with respect to the stage unit, and between which and the stage unit the first material to be stacked and the second material to be stacked are sandwiched;
a press member that is vertically movable with respect to the sandwiching member and simultaneously presses the first material to be stacked and the second material to be stacked; and
a guide pin that is inserted through the press member and moves up and down with respect to the press member, wherein the press member is configured to simultaneously press and integrally stamp out a stack, wherein the stack includes the first material to be stacked and the second material to be stacked, and
wherein the guide pin is passed through a first hole machined in advance in the first material to be stacked and a second hole machined in advance in the second material to be stacked, and guides the stack to the stage unit.

2. A stack manufacturing system comprising:
the stacking apparatus according to claim 1;
a first machining unit that machines the first material to be stacked; and
a second machining unit that machines the second material to be stacked.

3. The stack manufacturing system according to claim 2, wherein:
the first machining unit performs non-separating indentation machining by which at least part of an outer contour of a first stack to be stamped out of the first material to be stacked by the press member is shaped in a state of being locked to a first scrap portion of the first material to be stacked, wherein the first scrap portion is a portion of the first material other than the first stack; and
the second machining unit performs to-be-separated indentation machining by which at least part of an outer contour of a second stack to be stamped out of the second material to be stacked by the press member is shaped in a state of being locked to a second scrap portion of the second material to be stacked, wherein the second scrap portion is a portion of the second material other than the second stack.

4. The stack manufacturing system according to claim 2, wherein a direction in which the first machining unit conveys the first material to be stacked and a direction in which the second machining unit conveys the second material to be stacked are radially arranged about the stage unit.

* * * * *